Figure 1:
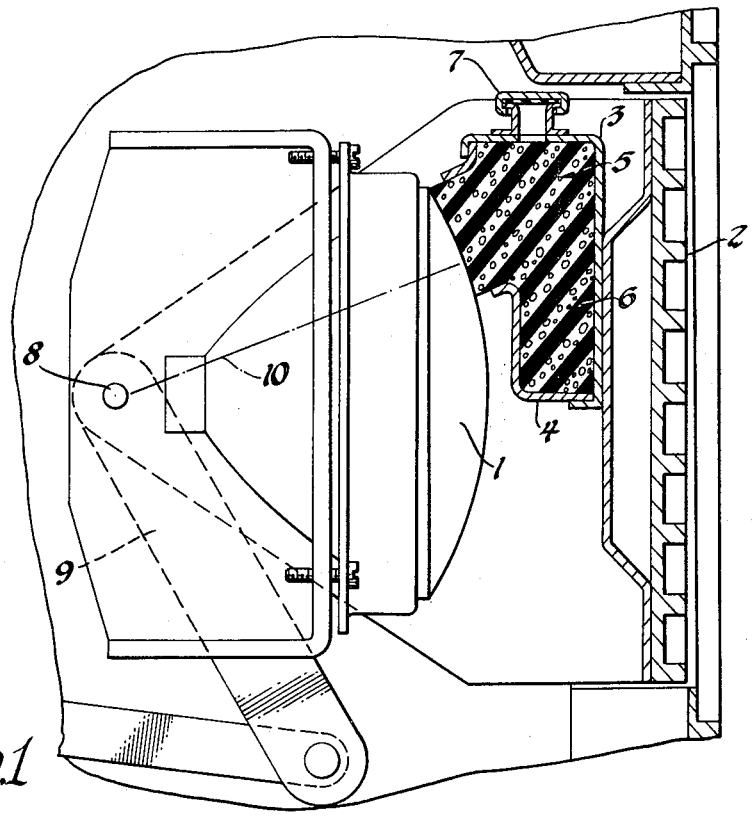

United States Patent [19]
Buchwald

[11] 3,708,822
[45] Jan. 9, 1973

[54] HEADLAMP CLEANER
[75] Inventor: Robert M. Buchwald, Birmingham, Mich.
[73] Assignee: General Motors Corporation, Detroit, Mich.
[22] Filed: Aug. 18, 1971
[21] Appl. No.: 172,734

[52] U.S. Cl. ............15/250.03, 15/250.3, 240/7.1 R
[51] Int. Cl. ................................................B60s 1/02
[58] Field of Search .........15/250.03, 250.01, 250.02, 15/250.04, 250.1, 250.19, 250.3; 240/7.1 R, 7.1 H

[56] References Cited

UNITED STATES PATENTS 1,890,414  12/1932  Rumpel...........................15/250.29
3,289,237  12/1966  Lindsey...........................15/250.24

FOREIGN PATENTS OR APPLICATIONS 1,545,841  10/1965  France ............................15/250.1
1,075,737   7/1967  Great Britain..................240/7.1 H Primary Examiner—Peter Feldman
Attorney—Frank J. Soucek et al.

[57] ABSTRACT

A vehicle headlamp washer is provided for concealed headlamps wherein the cover for the lamps provides a container for a sponge or similar material and as the cover is moved to expose the headlamp, the sponge wipes across the lamp to clean it.

4 Claims, 2 Drawing Figures

PATENTED JAN 9 1973 3,708,822

INVENTOR.
Robert M. Buchwald
BY
F.J. Soucek
ATTORNEY

HEADLAMP CLEANER

The present invention relates to a vehicle headlamp washer system and more particularly to a system for washing headlamps that are normally concealed by a movable cover.

It is well recognized that the lenses of vehicle headlamps become covered with dirt and road grime when a vehicle is driven on wet roads. This dirt and grime may reduce the effective intensity of the light beams. Systems have been provided wherein a pressure operated washer arrangement cleans the headlamps. The arrangement may include extensible and retractable nozzle means. Other systems may include headlamp wipers which may be mechanically driven or may be wind driven.

An object of the present invention is to provide a headlamp washer system for concealed headlamps.

A further object is to provide means whereby the movement of the headlamp cover from a closed to an open position causes wiping and cleansing of the vehicle headlamp.

A further object is to provide a sponge container movable over the headlamp wherein the headlamp cover forms a portion of the container.

The aforementioned and other objects are accomplished in the present invention by attaching wall means on the headlamp cover to define a container having an open end adjacent the headlamp lens. A sponge or saturable synthetic material saturated with a washer fluid is placed in the container and the arrangement is such that the sponge contacts and wipes across the lens as the cover is moved from a first position wherein the headlamp is concealed to a second position wherein the headlamp is exposed. Liquid solvent may be supplied to the sponge through a nozzle formed on the container.

Further objects and advantages of the present invention will be apparent from the following description when read in connection with the accompanying drawing wherein like numerals depict like parts for the several views.

Figure 2:
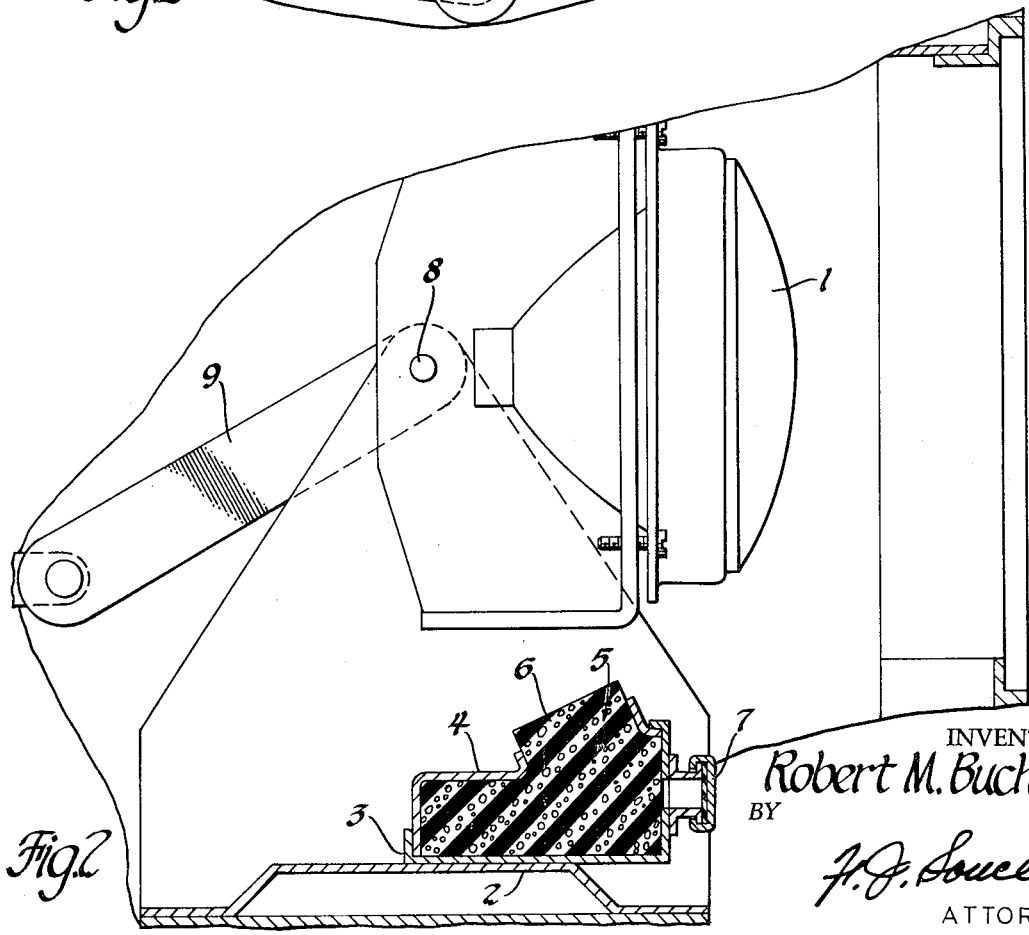

In the drawing:

FIG. 1 is an elevated view, partly in section, illustrating the present invention; and FIG. 2 is an elevated view, partly in section, further illustrating the present invention.

Referring now to the drawing, the headlamp 1 is provided with a movable cover 2 that has members 3 and 4 secured thereto to provide a container 5 for holding a sponge 6. A filler cap 7 provides means for saturating sponge 6 with washer fluid. The cover 2 is caused to pivot about fulcrum 8 by means of an actuating lever 9 that may be connected to a vacuum motor (not shown). Movement of the cover 2 causes the sponge 6 to wipe the surface of the headlamp 1.

It should be noted that the distance 10 between the fulcrum 8 and the open end of the container is substantially equal to the radius of the headlamp.

As the movable grill or cover 2 moves up and down, dirt will be removed from the seal beamed unit 1.

While a preferred embodiment of the invention has been disclosed it will be obvious to one skilled in the art that minor changes can be made without departing from the spirit or scope of the invention as defined by the following claims.

What is claimed is:

1. In a headlamp washer mechanism for concealed headlamps the combination comprising a headlamp to be washed, a cover for said headlamp, means to move said cover from a first position wherein said headlamp is concealed to a second position wherein said headlamp is exposed, wall means secured to said cover to form a container between said cover and said headlamp, and sponge means secured in said container and contacting said headlamp, the arrangement being such that said sponge means wipes across the surface of said headlamp when said cover is moved between said first and said second positions.

2. In a headlamp washer mechanism as defined by claim 1 wherein means is provided on said container for saturating said sponge with a washer fluid.

3. In a headlamp washer mechanism for concealed headlamps the combination comprising a headlamp to be washed, a cover for said headlamp, a fulcrum about which said cover pivots, means to move said cover about said fulcrum from a first position wherein said headlamp is concealed to a second position wherein said headlamp is exposed, wall means secured to said cover to form a container between said cover and said headlamp and having an open end adjacent said headlamp, the distance between said fulcrum and the open end of said container defining a radius substantially equal to the radius of said headlamp, and sponge means secured in said container and contacting said headlamp, the arrangement being such that said sponge means wipes across the surface of said headlamp when said cover is moved between said first and said second positions.

4. In a headlamp washer mechanism as defined by claim 3 wherein means is provided on said container for saturating said sponge means with a washer fluid.

* * * * *